United States Patent [19]
Hamada et al.

[11] Patent Number: 6,113,136
[45] Date of Patent: Sep. 5, 2000

[54] AIR BAG APPARATUS

[75] Inventors: Makoto Hamada, Toyota; Osamu Fukawatase, Nishikamo, both of Japan

[73] Assignee: Toyota Jidosha Kabushiki Kaisha, Aichi-ken, Japan

[21] Appl. No.: 08/784,684

[22] Filed: Jan. 22, 1997

[30] Foreign Application Priority Data

Jan. 24, 1996 [JP] Japan ................................ 8-009970

[51] Int. Cl.[7] .................................................. B60R 21/22
[52] U.S. Cl. .................. 280/731; 280/728.2; 280/743.1; 280/743.2
[58] Field of Search ............................. 280/731, 743.1, 280/743.2, 742, 740, 736, 728.1, 728.2, 730.2

[56] References Cited

U.S. PATENT DOCUMENTS

| | | | |
|---|---|---|---|
| 3,714,844 | 2/1973 | Tsuda | 280/731 |
| 3,744,817 | 7/1973 | Ousset | 280/730.1 |
| 3,982,774 | 9/1976 | Ivashuk et al. | 280/731 |
| 5,085,463 | 2/1992 | Kreuzer | 280/731 |
| 5,087,067 | 2/1992 | Seki et al. | 280/728.2 |
| 5,121,941 | 6/1992 | Mihm et al. | 280/728.2 |
| 5,425,552 | 6/1995 | Linder | 280/743.1 |
| 5,458,364 | 10/1995 | Mueller et al. | 280/728.2 |

FOREIGN PATENT DOCUMENTS

| | | |
|---|---|---|
| 4137953 | 12/1992 | Japan . |
| 6328990 | 11/1994 | Japan . |
| 789402 | 4/1995 | Japan . |

*Primary Examiner*—Eric Culbreth
*Attorney, Agent, or Firm*—Kenyon & Kenyon

[57] ABSTRACT

An air bag apparatus includes a base member supported on a steering wheel, a bag body accommodated in the base member in a folded state, and an inflator mounted on the base member for ejecting a gas and inflating the folded bag body at the time of vehicle collision. The inflator is elongate and substantially rectangular in shape as viewed from a driver and a longitudinal direction of the inflator is substantially perpendicular to a transverse direction of the vehicle when the steering wheel is in a neutral position.

23 Claims, 17 Drawing Sheets

F I G. 8
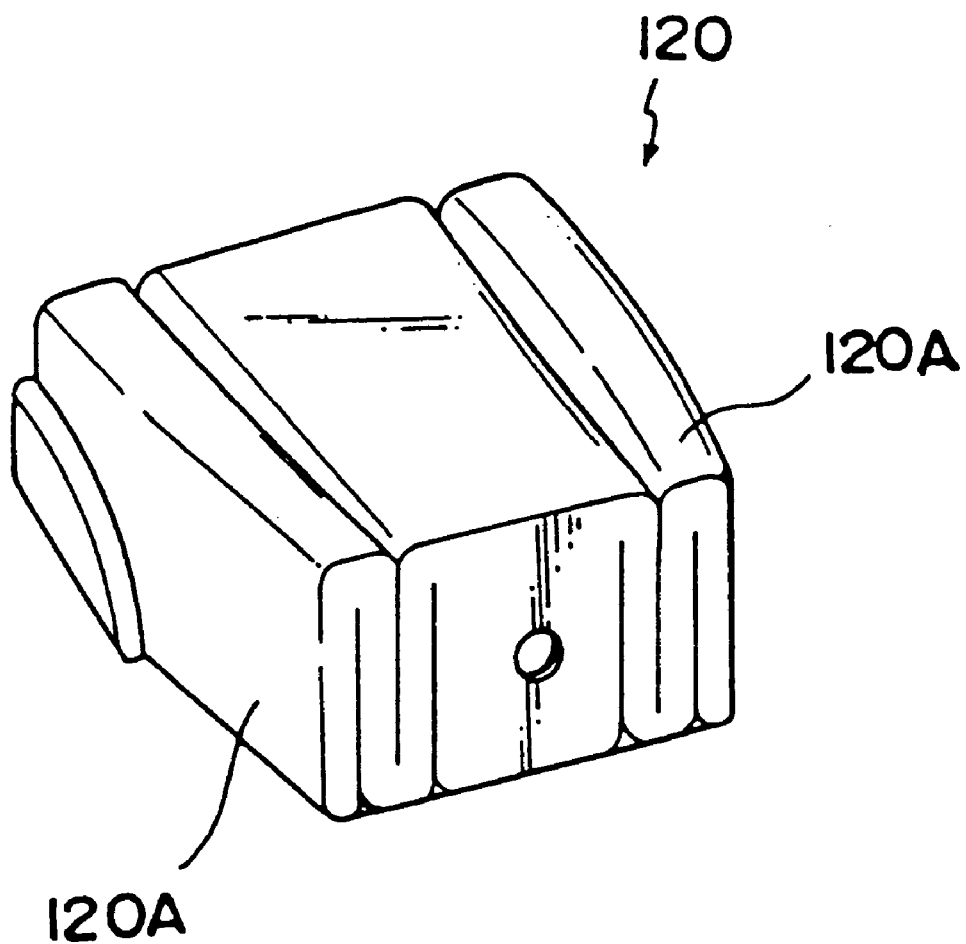

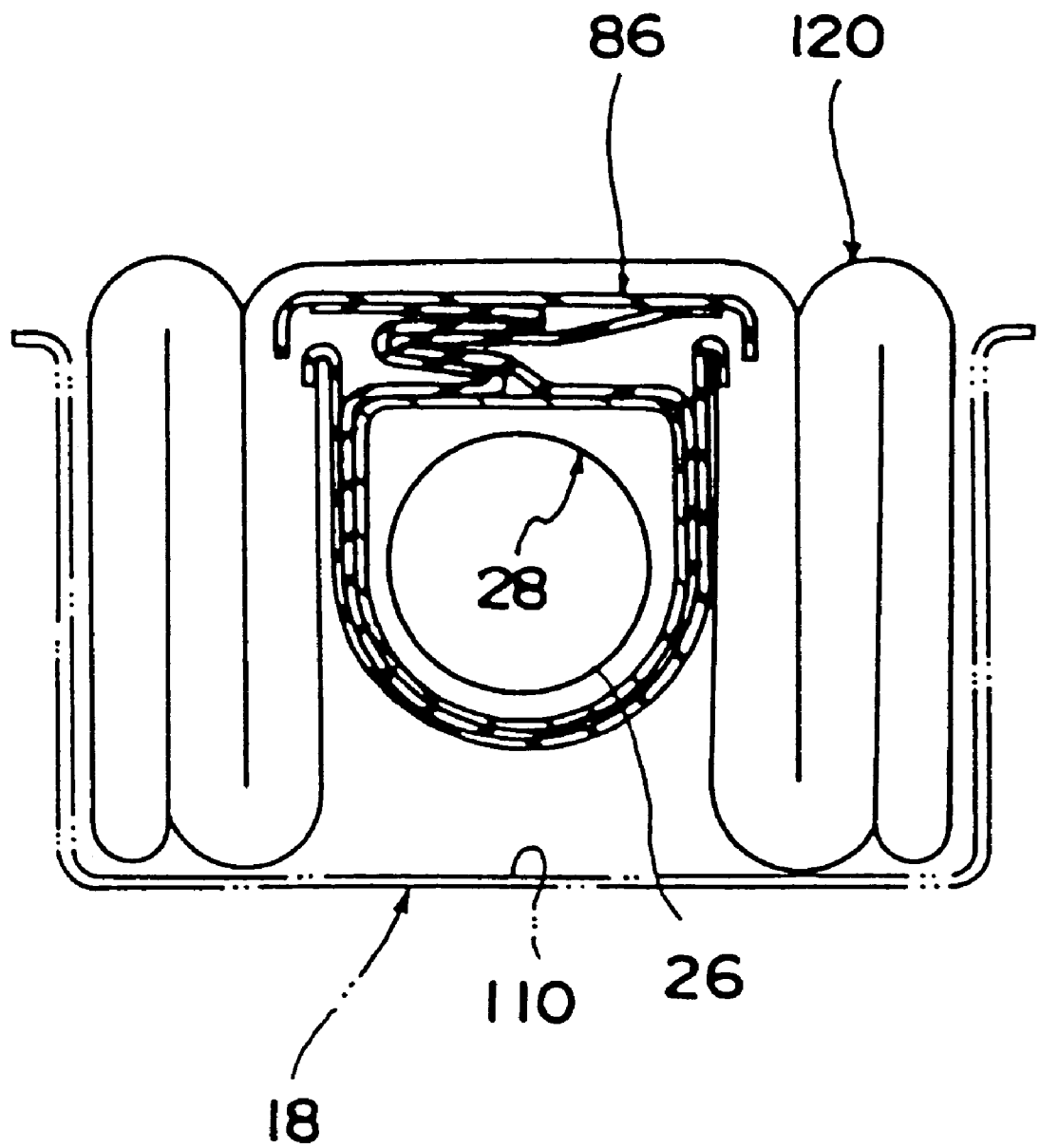

F I G. 1 1
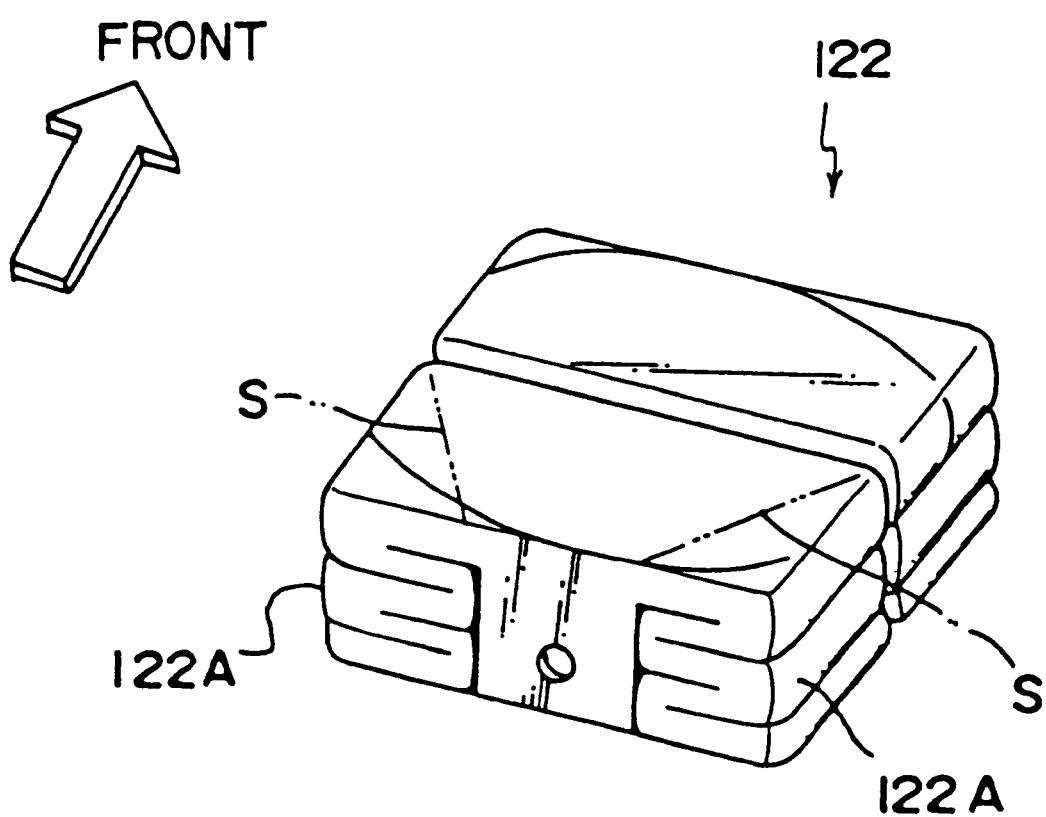

F I G. 1 4
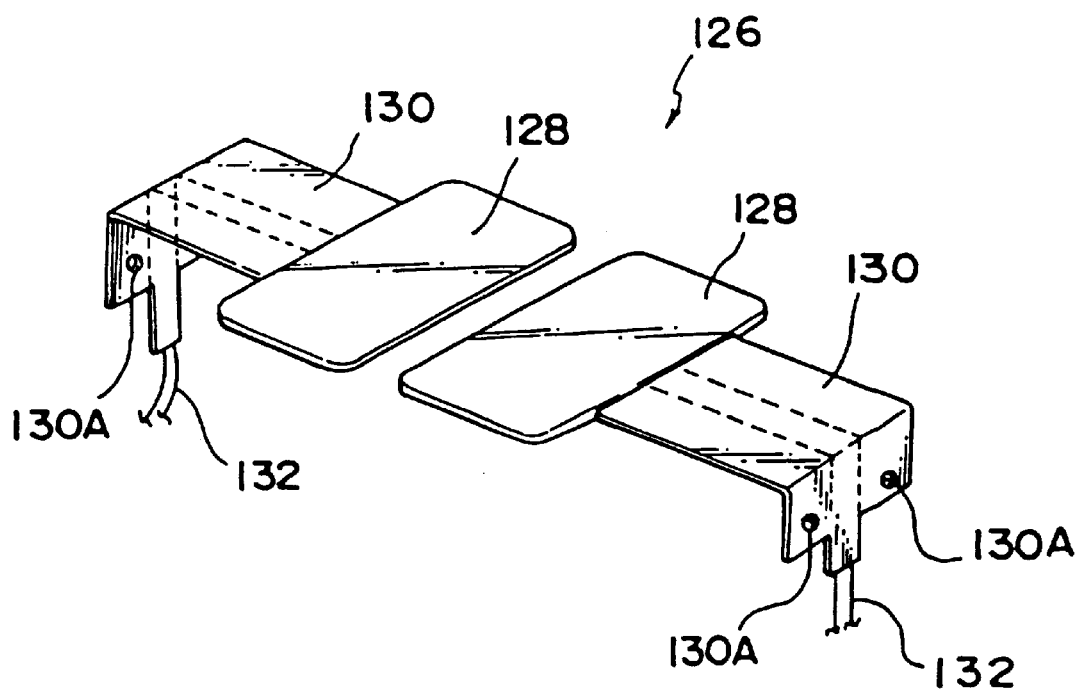

AIR BAG APPARATUS

BACKGROUND OF THE INVENTION

1. Field of the Invention

The present invention relates to an air bag apparatus used as a vehicle occupant protecting apparatus.

2. Description of the Related Art

There are two types of conventional steering wheels: a four-spoke type and a three-spoke type. An air bag apparatus as a vehicle occupant protecting apparatus is mounted on the four-spoke steering wheel in many cases. There is also demand, however, for mounting an air bag apparatus on the three-spoke steering wheel. In view of this fact, JP-U 4-137953 discloses an example of a configuration in which an air bag apparatus can be mounted on the three-spoke steering wheel. JP-A 6-328990 discloses a method of folding an air bag by folding back the corners thereof into a trapezoidal form. Further, JP-A 7-89402 discloses an air-bag folding structure, in which the triangular portions of a pentagonally-folded air bag have more folds than the rectangular portions thereof.

The invention disclosed in JP-U 4-137953 will be described below.

As shown in FIG. 15, an air bag apparatus 150 comprises a base plate 152 which is formed substantially trapezoidal in plan view, an inflator 154 mounted on the base plate 152 which eject a gas when the vehicle suddenly decelerates, a bag main body 156 arranged in a folded state on the driver side of the base plate 152, and an air bag pad 158 which is formed substantially trapezoidal in plan view and is mounted on the base plate 152.

As shown in FIG. 16, the air bag apparatus 150 is mounted in such a manner that predetermined spaces 160, 162 are formed between a pair of inclined side walls 152A, 152B of the base plate 152 and a pair of inclined side walls 158A, 158B of the air bag pad 158. A pair of bent portions 156A, 156B of the bag body 156 originally folded in a rectangular form in plan view are inserted into the spaces 160, 162, respectively.

More specifically, as shown in FIG. 17, in order to improve the external design of a three-spoke steering wheel 164, a smoother connection line is demanded among spokes 164A, and 164B extending in the transverse direction of the vehicle and spoke 164C extending in the longitudinal direction of the vehicle. Further, from the standpoint of manufacturing efficiency of the bag body 156, the method of folding the bag body 156 should remain unchanged. Taking these points into consideration, in the above-mentioned structure, the spaces 160, 162 are formed by changing the shape of the base plate 152 and the air bag pad 158 so that the bent portions 156A, 156B of the bag body 156 are inserted into spaces 160, 162, respectively.

However, this structure poses the problem that the bag body 156 cannot be made compact since the inflator 154 has a flat and substantially cylindrical shape and the greater proportion of a top wall 152C of the base plate 152 on which the bag body is mounted is occupied by the inflator 154. In other words, the driver-side portion of the inflator 154 (an upper case 168 side portion formed with gas ejection holes 166) is required to be inserted into an opening (not shown) of the bag body 156, and therefore the bag body 156 is required to be mounted on the base plate 152 so as to cover the upper case 168 of the inflator 154. As the inflator 154 has a flat and substantially cylindrical shape as described above, an attempt to arrange the bag body 156 in a position to cover the inflator 154, the longitudinal and lateral sizes of the bag body 156 unavoidably increases. Therefore the problem that the bag body 156 cannot be made compact arises.

This problem becomes more conspicuous especially in the case where the air bag apparatus 150 is mounted on the three-spoke steering wheel 164.

SUMMARY OF THE INVENTION

In view of the above-described circumstances, it is an object of the present invention to provide an air bag apparatus in which the bag body can be made compact.

In accordance with a first aspect of the present invention, an air bag apparatus comprises: a base member supported on a steering wheel; a bag body accommodated in the base member in a folded state; and an inflator mounted on the base member for ejecting a gas and inflating the folded bag body at the time of vehicle collision, and the inflator is elongate and substantially rectangular in shape as viewed from a driver and a longitudinal direction of the inflator is substantially perpendicular to a transverse direction of the vehicle when the steering wheel is in neutral position.

In accordance with a second aspect of the present invention, the air bag apparatus according to the first aspect of the present invention further comprises: restriction means for restricting inflation of the bag body, one end of the restriction means being fixed on the inflator and the other end of the restriction means being fixed on a driver side base cloth of the bag body.

In accordance with a third aspect of the present invention, the air bag apparatus according to the first and second aspects of the present invention further comprises: rectifying means provided around the inflator for rectifying the flow of the gas ejected from an inflator into the bag body.

In accordance with a fourth aspect of the present invention, in the air bag apparatus according to the third aspect of the present invention, when the rectifying means is mounted on the base member via the inflator, a surface of the rectifying means opposes the driver and is substantially flat, and is disposed substantially parallel to a surface of a pad which covers the bag body.

In accordance with a fifth aspect of the present invention, in the air bag apparatus according to the first aspect of the present invention, the bag body is folded a different number of times in respective bag accommodating spaces of said base member in accordance with the size of a bag accommodating space portion of the base member.

In accordance with a sixth aspect of the present invention, in the air bag apparatus according to the fifth aspect of the present invention, the number of times that a portion of the bag body, which is accommodated in a large bag accommodating space portion of the base member, is folded a greater number of times than a portion of the bag body, which is accommodated in a small bag accommodating space portion of the base member, is folded.

In accordance with a seventh aspect of the present invention, in the air bag apparatus according to the sixth aspect of the present invention, the steering wheel is a three-spoke type steering wheel, and the large bag accommodating space portion is disposed lower than the small bag accommodating space portion and protrudes further toward the front side of the vehicle than the small bag accommodating space portion.

In accordance with the first aspect of the present invention, since the inflator is elongate and substantially rectangular in shape as viewed from a driver and a longitudinal direction of the inflator is substantially perpendicular to the transverse direction of the vehicle when the steering wheel is in a neutral position, a sufficient accommodating space is secured on both sides of the inflator. For this reason, the freedom of folding the bag body is improved. Hence, an outstanding advantage is obtained in that it is possible to make the bag body compact.

In accordance with the second aspect of the present invention, in the first aspect of the present invention, since one end of the restriction means for restricting inflation of the bag body is fixed on the inflator and the other end of the restriction means is fixed on the driver side base cloth of the bag body, the first end of the restriction means is not required to be fixed on the front side base cloth of the bag body. Hence an outstanding advantage is obtained in that it is possible to facilitate the sewing of the bag body.

In accordance with the third aspect of the present invention, in the first and second aspects of the present invention, since the rectifying means is provided around the inflator for rectifying the flow of the gas ejected from the inflator into the bag body, the gas flows into the bag body while being efficiently diffused. Hence an outstanding advantage is obtained in that it is possible to improve the inflation rate of the bag body.

In accordance with the fourth aspect of the present invention, in the third aspect of the present invention, since the rectifying means is mounted on the base member via the inflator, a surface of the rectifying means opposes the driver and is substantially flat, and is disposed substantially parallel to a surface of a pad which covers the bag body, i.e., since the surface of the rectifying means facing the driver is free of ruggedness, the uncomfortable feeling when the driver touches the pad surface is eliminated. Hence an outstanding advantage is obtained in that it is possible to improve the driver's feeling in handling the steering wheel.

In accordance with the fifth aspect of the present invention, in the first aspect of the present invention, since the bag body is folded a different number of times in accordance with the size of the bag accommodating space portion of the base member, the unevenness of the bag body in the accommodating space is eliminated and made smooth. Accordingly, the uncomfortable feeling when the driver touches the pad surface is eliminated. Hence an outstanding advantage is obtained in that it is possible to improve the driver's feeling in handling the steering wheel.

In accordance with the sixth aspect of the present invention, in the fifth aspect of the present invention, since the number of times that a portion of the bag body, which is accommodated in a large bag accommodating space portion of the base member, is folded is greater than the number of times that a portion of the bag body, which is accommodated in a small bag accommodating space portion of the base member, is folded, the unevenness of the bag body in the accommodating space is eliminated and made smooth. Accordingly, the uncomfortable feeling when the driver touches the pad surface is eliminated. Hence an outstanding advantage is obtained in that it is possible to improve the driver's feeling in handling the steering wheel.

In accordance with the seventh aspect of the present invention, in the sixth aspect of the present invention, since the steering wheel is a three-spoke type steering wheel, and the large bag accommodating space portion is disposed lower than the small bag accommodating space portion and protrudes further toward the front side of the vehicle than the small bag accommodating space portion, the protruded large bag accommodating space portion is invisible to the driver. Hence an outstanding advantage is obtained in that it is possible to improve the quality of appearance of the three-spoke steering wheel with the air bag apparatus.

BRIEF DESCRIPTION OF THE DRAWINGS

FIG. 8 is a perspective view showing another method of folding the bag body.

FIG. 10 is a cross sectional view of the main portion of an air bag apparatus comprising the bag body shown in FIG. 8, and corresponds to FIG. 5.

FIG. 11 is a perspective view showing a bag body before being folded by another folding method.

FIG. 14 is a perspective view showing the pressure-sensing switch of FIG. 13.

DESCRIPTION OF THE PREFERRED EMBODIMENTS

Figure 1:
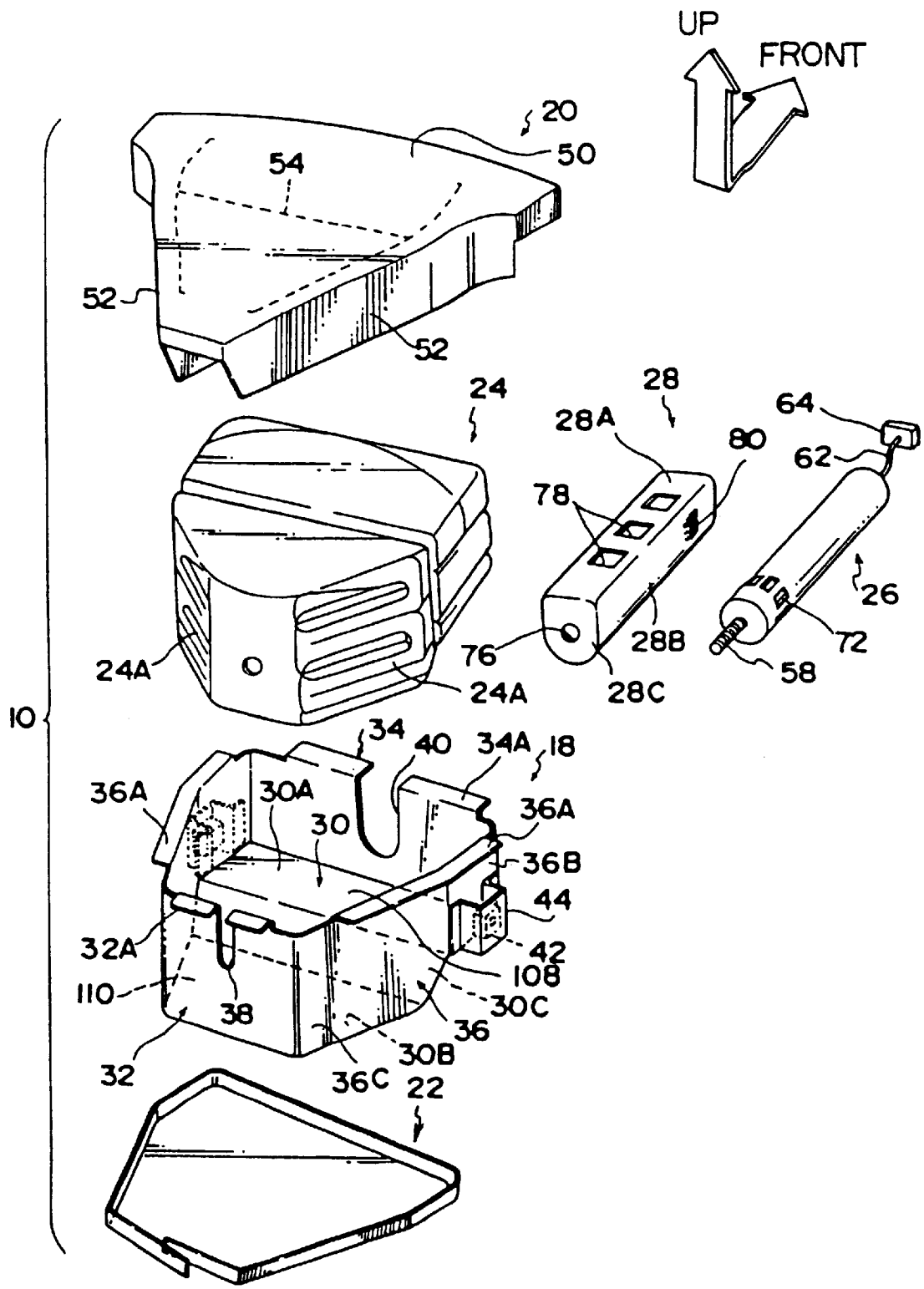
FIG. 1 is an exploded perspective view showing an air bag apparatus according to an embodiment of the present invention.

An embodiment of the present invention will be described below with reference to FIGS. 1 to 7.

In the drawings, the arrow FRONT indicates the direction toward the front part or forward part of the vehicle, and the arrow UP indicates the direction toward the upper part or upward part of the vehicle.

Figure 2:
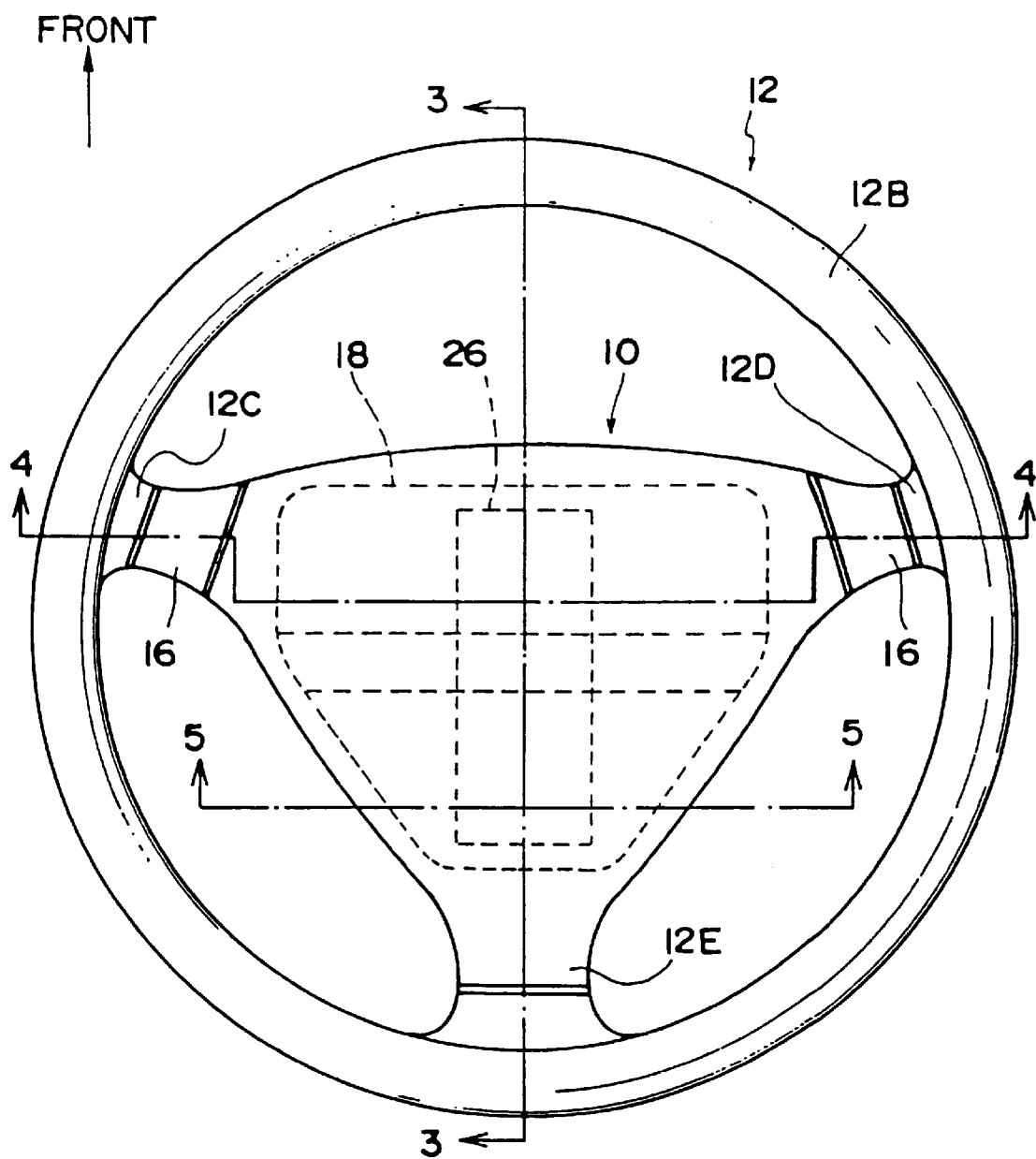
FIG. 2 is a front view showing a three-spoke steering wheel with the air bag apparatus of FIG. 1 as viewed from the driver.
Figure 3:
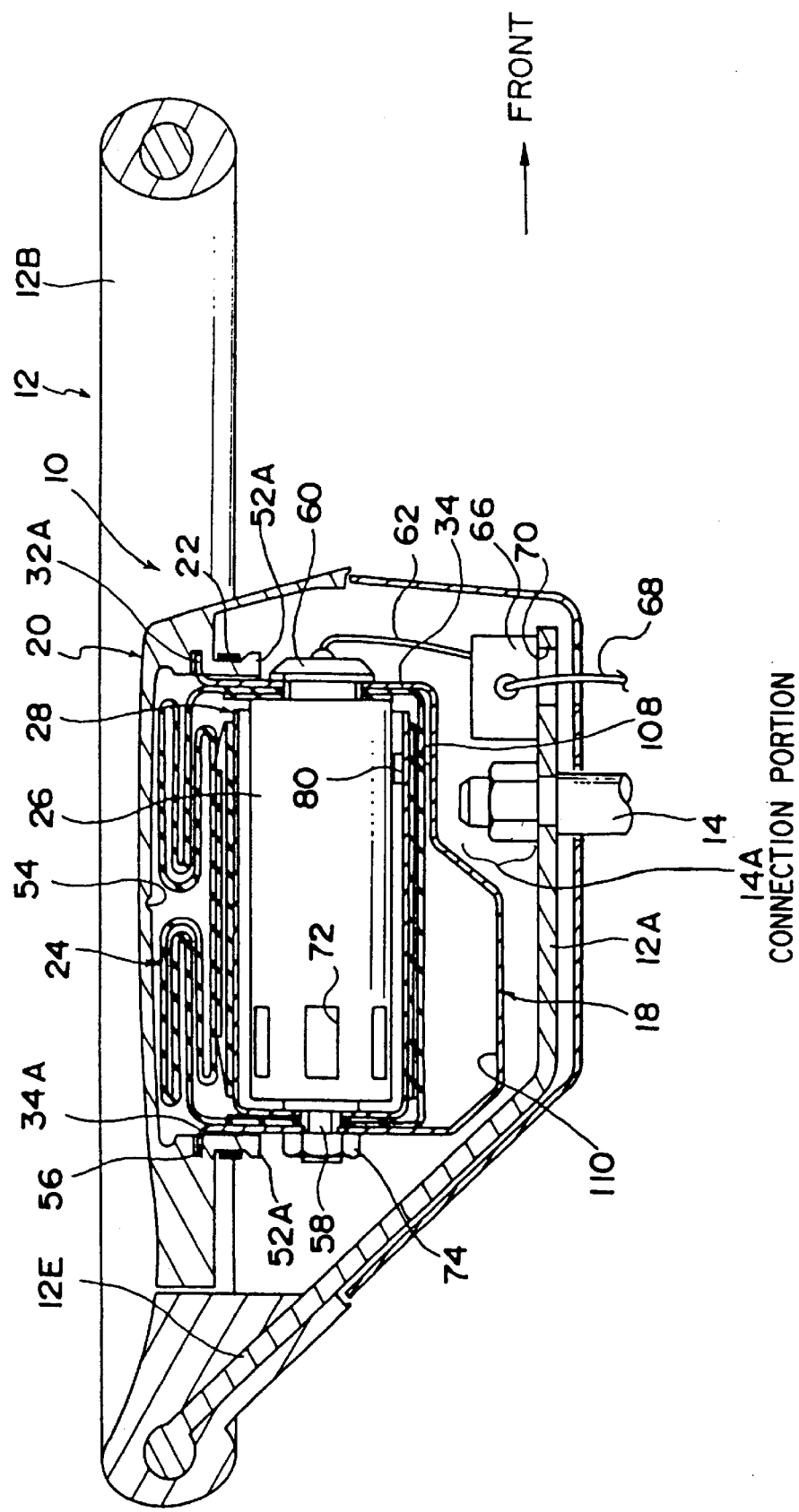
FIG. 3 is a longitudinal sectional view showing the steering wheel with the air bag apparatus of FIG. 2 taken along line 3—3 of FIG. 2.
Figure 4:
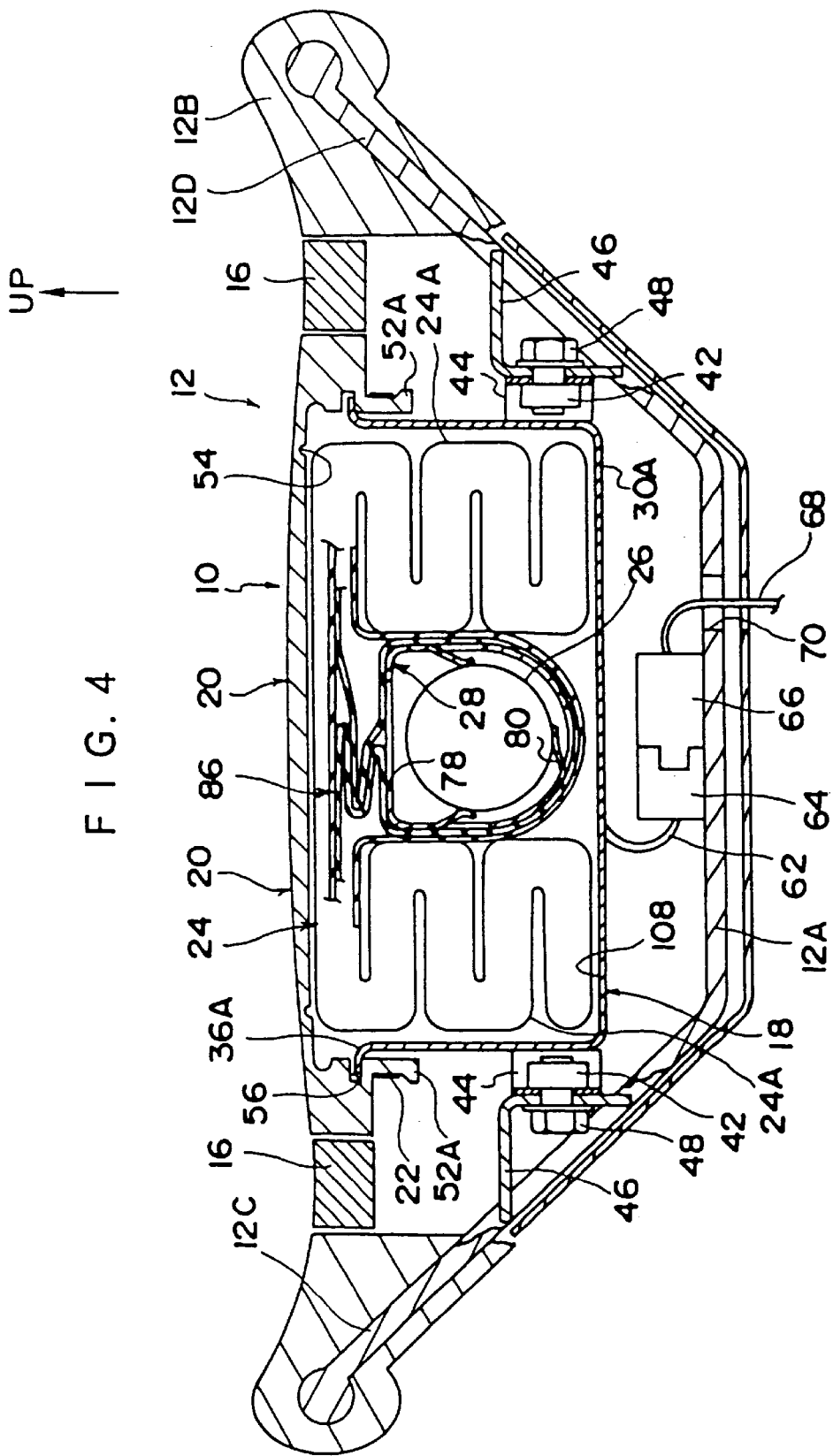
FIG. 4 is a cross sectional view showing the steering wheel with the air bag apparatus of FIG. 2 taken along line 4—4 of FIG. 2.
Figure 5:
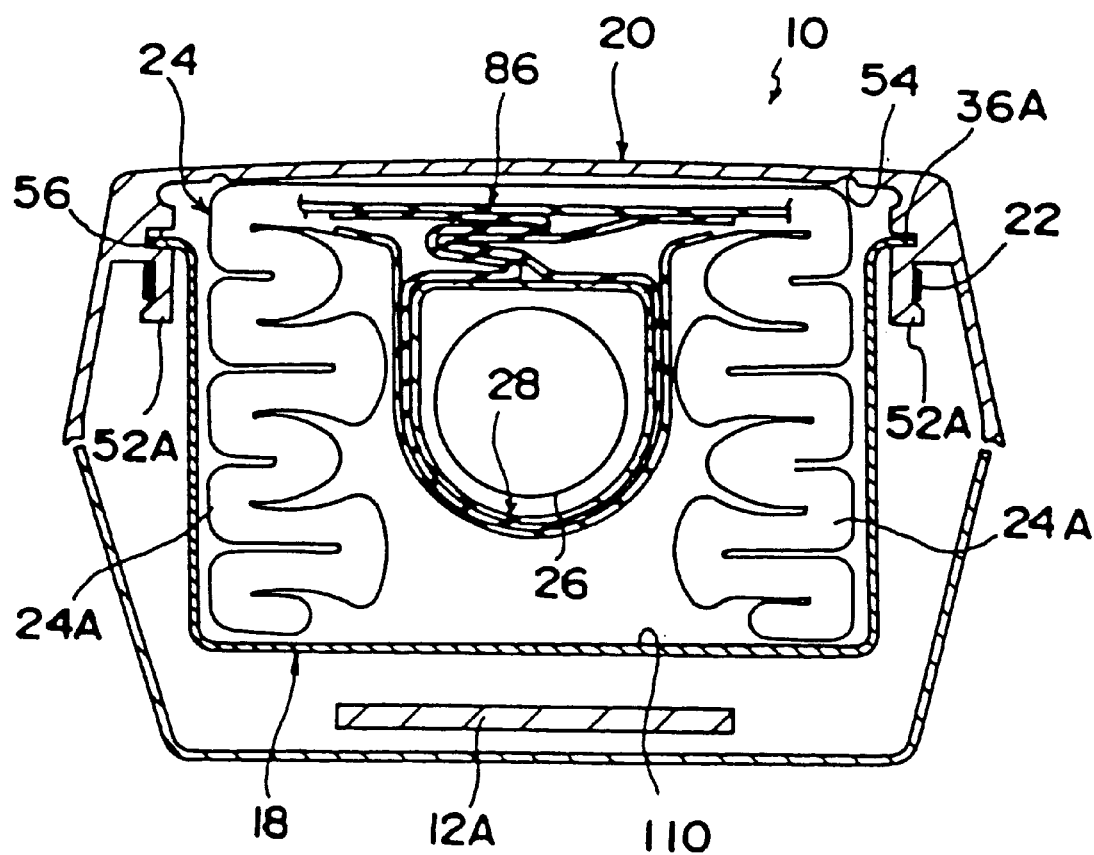
FIG. 5 is a cross sectional view showing the steering wheel with the air bag apparatus of FIG. 2 taken along line 5—5 of FIG. 2.

FIG. 2 shows a steering wheel 12 having the air bag apparatus 10 as viewed from the driver, and FIGS. 3 to 5 show a longitudinal sectional structure or a cross sectional structure of the steering wheel 12 having the air bag apparatus 10. Further, FIG. 1 shows an exploded perspective view of the air bag apparatus 10. With reference to these drawings, the general configuration of the steering wheel 12 having the air bag apparatus 10 will be explained below.

The steering wheel 12 includes a hub 12A for fixing a steering shaft 14 (FIG. 3) at connection portion 14A, a rim 12B arranged substantially parallel with the hub 12A and three spokes 12C, 12D, 12E connecting the hub 12A and the rim 12B. Horn buttons 16 are arranged on spokes 12C, and 12D and extended along the transverse direction of the vehicle when the steering wheel 12 is in a neutral position (the state shown in FIG. 2).

As shown in FIG. 1, on the other hand, the air bag apparatus 10 comprises an air bag case 18 as a base member substantially in box shape, an air bag pad 20 for closing the opening (driver side) of the air bag case 18, a ring 22 for fixing the air pad 20 to the air bag case 18, a bag body 24 held between the air bag pad 20 and the air bag case 18, an inflator 26 held in the bag body 24, and a diffuser 28 as the rectifying means covering the inflator 26. A specific configuration will be explained below with reference to these component parts in that order.

The air bag case 18 includes a bottom wall 30 formed substantially in a trapezoidal shape in a plan view from the driver, a rear wall 32 erected from the rear edge of the bottom wall 30, a front wall 34 erected from the front edge of the bottom wall 30 and a pair of side walls 36 connecting the rear wall 32 and the front wall 34 erected from the side edges of the bottom wall 30. Flanges 32A, 34A, 36A bent outward from the upper ends are formed integrally at the upper ends of the rear wall 32, the front wall 34 and the side wall 36. Also, a first fixed groove 38 recessed in narrow U shape is formed at substantially widthwise direction central portion of the rear wall 32. A second fixed groove 40 recessed in a substantially wide U shape is formed at a substantially widthwise direction central portion of the front wall 34 so as to oppose the first fixed groove 38, and is formed wider than the first fixed groove 38. The bottom wall 30 has the front wall section 30A and the rear wall section 30B lower than the front wall section 30A, which are connected with each other through an inclined stepped section 30C. Further, each side wall 36 includes a front side wall 36B arranged along the longitudinal direction of the vehicle and a rear side wall 36C bent inward in the transverse direction of the vehicle at a predetermined angle. Of these component parts, at the outer side surface of the front side wall 36B, a substantially hat-shaped bracket 44 which is welded with a weld nut 42 at the intermediate portion is mounted.

The air bag case 18 described above is fixed on the steering wheel 12 with a mounting bolt 48 screwed to a weld nut 42 from the angle-shaped bracket 46 arranged on the steering wheel 12 shown in FIG. 4.

The air bag pad 20 includes a top portion 50 formed substantially in a triangle as viewed from the driver, and a side portion 52 drooped down from the peripheral edge of the top portion 50. A thin wall portion substantially in the shape of reverse A is formed on the vehicle occupant side surface of the top portion 50. Also, a slit-shaped engaging groove 56 is formed at a predetermined portion of the widthwise direction inner side of the side portion 52. The flanges 32A, 34A, 36a of the air bag case 18 are inserted into the engaging groove 56 thereby to fixedly engage the air bag pad 20 to the air bag case 18 (see FIGS. 3 to 5).

The ring 22 is band shaped before being assembled. After the air bag pad 20 is engaged with the air bag case 18, the ring 22 is wound with a predetermined fastening force on the outer periphery of the leg 52A provided at the widthwise direction inner side of the side portion 51 of the air bag pad 20. In this condition, the ends of the ring 22 are fixed by welding, bonding or other fixing means (see FIGS. 3 to 5).

The inflator 26 is cylinder-shaped, and has a thin rectangular shape as viewed from the driver (see FIG. 2). A bolt 58 is protruded from a longitudinal end of the inflator 26. A protrusion 60 (see FIG. 3), which is formed in a stepped cylinder shape and which is smaller in diameter than the inflator 26, protrudes at the other end of the inflator 26. The protrusion 60 has therein an electric ignition type ignition device. A female connector is mounted at an end of the cord 62 withdrawn from the ignition unit. The female connector 64 is connected with a male connector 66 (see FIG. 3). The cord 68 withdrawn from the male connector 66 is led out of a through hole 70 formed in the hub 12A and connected to a control unit (not shown). Further, a plurality of gas ejection holes 72 are formed along the periphery of an end of the inflator 26.

The above-mentioned inflator 26 may be either of a high-pressure gas sealed-in type or a gas generation agent filled type. In the former case, a high-pressure gas is sealed in a chamber defined by a partitioning wall, and when the vehicle is suddenly decelerated, the ignition unit is activated to break the partitioning wall thereby to eject a gas from the gas ejection holes 72. In the latter case with the gas generation agent filled, and the ignition unit is activated when the vehicle is suddenly decelerated to burn the gas generation agent, thereby ejecting the gas from the gas ejection holes 72.

The inflator 26 described above is fixed on the air bag case 18 by screwing the nut 74 to the bolt 58 with the bolt 58 inserted in a first fixing groove 38 of the air bag case 18 and with the protrusion 60 fixedly inserted in a second fixing groove 40. In this fixed state, the stepped protrusion 60 of the inflator 26 is engaged with the front wall 34 of the air bag case 18 and functions as a stopper. In a state in which the inflator 26 is fixed on the air bag case 18, the longitudinal direction of the inflator 26 is arranged perpendicular to the transverse direction of the vehicle when the steering wheel 12 is in neutral position (see FIG. 2).

The diffuser 28 includes a top wall portion 28A providing a flat surface, a side wall portion 28B connecting the widthwise direction edges of the top wall portion 28A by a substantially arcuate surface, and a bottom wall portion 28C closing a longitudinal direction of one end portion of said diffuser 28. A portion of the diffuser 28 thus substantially assumes a cylindrical shape as a whole. At the central portion of the bottom wall 28C of the diffuser 28, a bolt insertion hole 76 is provided so that the bolt 58 of the inflator 26 is inserted through. At the top wall portion 28A of the diffuser 28, a plurality of rectifying ports 78 is formed at predetermined intervals. Further, a plurality of elastically deformable holding pieces 80 protruded from the side wall portion 28B of the diffuser 28 toward the axial line of the diffuser 28 are formed integrally with the side wall portion 28B in the vicinity of an end longitudinally opposite from the bottom wall 28C. According to this embodiment, the holding pieces 80 are arranged equidistantly at three peripheral points (see FIG. 4). The inflator 26 described above is inserted from the other end (i.e., the open end) of the diffuser 28 and assembled with the bolt 58 protruded from the bolt insertion hole 76. In the process, the inflator 26 is elastically supported by the holding pieces 80.

Figure 6:
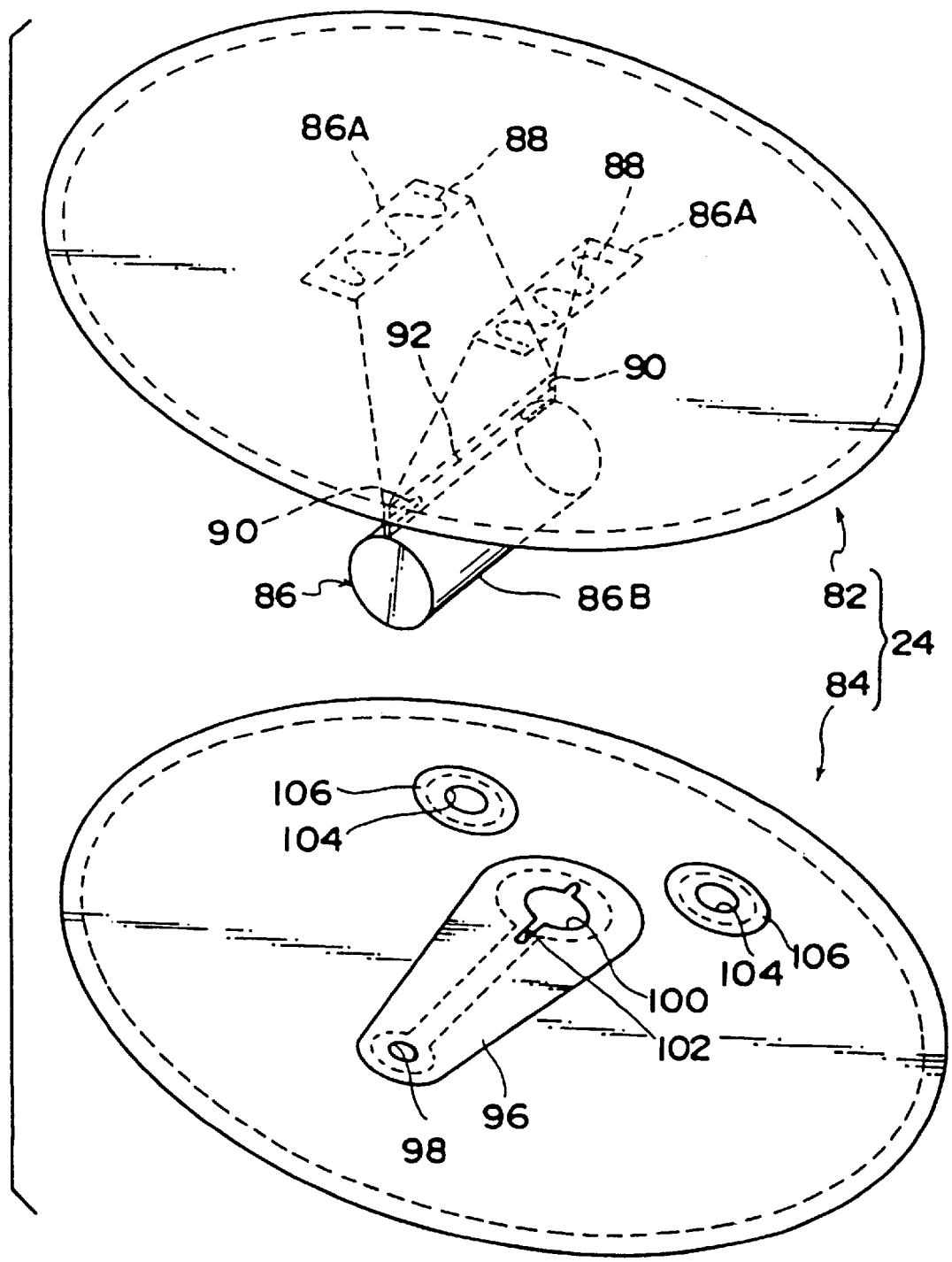
FIG. 6 is a perspective view showing the first base cloth and the second base cloth comprising the bag body of FIG. 1 separated from each other.

The bag body 24, as shown in FIG. 6, includes a first base cloth 82 arranged on the driver side (i.e., the air bag pad 20 side) when assembled on the vehicle and a second base cloth 84 arranged on the side far from the driver (i.e., on the hub 12A side of the steering wheel 12). The first base cloth 82 and the second base cloth 84 are integrated with the peripheral edges thereof sewed to each other. In FIG. 6, the first base cloth 82 is shown from the front side, and the second base cloth 84 from the rear side.

A strap 86, which serves as a means for restricting the inflation of the bag body 24, is mounted at the substantially central portion of the reverse side of the first base cloth 82 in such a manner that the bag body 24 assumes a substantially flat spherical shape when unfolded. The strap 86 is configured of a comparatively wide and long cloth material. The ends 86A of the strap 86 are sewed by a sewing thread 88 to the first base cloth 82 and thereby fixed on the first base cloth 82. Also, a cylindrical portion 86B is formed at the substantial intermediate portion of the strap 86 so as to drop and away from the first base cloth 82. The inner diameter of the cylindrical portion 86B is set somewhat larger than the outer diameter of the diffuser 28. The longitudinal direction sides at the upper end of the cylindrical portion 86B are sewed by the sewing thread 90. As a result, a gap 92 for flowing a gas is formed in the longitudinal direction intermediate portion between a pair of sewing threads 90.

A substantially elliptical cloth pad 96 is sewed on the reverse side of the second base cloth 84. A small hole 98, into which the bolt 58 of the inflator 26 is inserted, is formed in one longitudinal direction end portion of the cloth pad 96. The other end portion of the cloth pad 96 is formed with a large hole 100 into which the other end of the inflator 26 is to be inserted. Further, a slit 102 extending radially outward is formed at a predetermined position of the large hole 100. The small hole 98, the large hole 100 and the slit 102 are formed in the second base cloth 84 in the same shape. Consequently, at the time of assembly, the front surface of the first base cloth 82 and the front surface of the second base cloth 84 are superposed and sewed one on the other, and then the first base cloth 82 is reversed by using the large hole 100 of the second base cloth 84. Then, the large hole 100 is enlarged using the slit 102 while inserting the diffuser 28 and the inflator 26 into the cylindrical portion 86. A pair of vent holes 104 for reducing the internal pressure of the bag body 24 when the driver is in contact with the bag body 24 and a cloth pad 106 having a hole of substantially the same size as the vent hole 104 are sewed in the vicinity of the large hole 100 of the second base cloth 84.

Now, a method of folding the bag body 24 described above will be explained with reference to FIGS. 7A through 7F. FIGS. 7A through 7F show a folding method in which the bag body 24 is folded along the contour lines with the first base cloth 82 and the second base cloth 84 superposed one on the other.

Figure 7A:
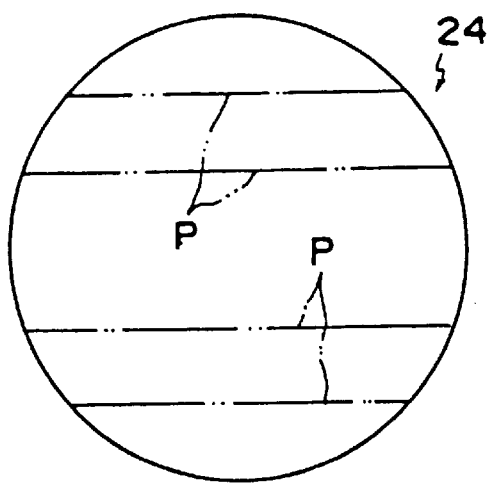
FIG. 7A is a diagram for explaining a method of folding the bag body shown in FIG. 1.
Figure 7B:
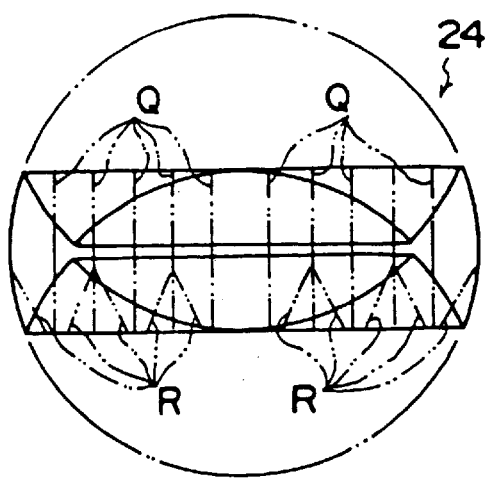
FIG. 7B is a diagram for explaining a method of folding the bag body shown in FIG. 1.
Figure 7C:
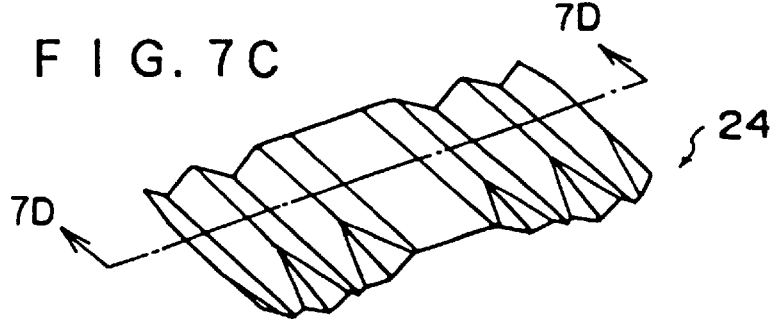
FIG. 7C is a diagram for explaining a method of folding the bag body shown in FIG. 1.
Figure 7D:
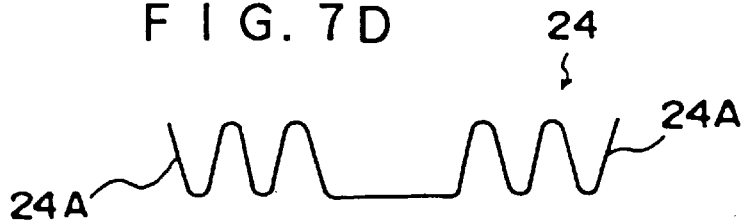
FIG. 7D is a diagram for explaining a method of folding the bag body shown in FIG. 1.
Figure 7E:
FIG. 7E is a diagram for explaining a method of folding the bag body shown in FIG. 1.
Figure 7F:
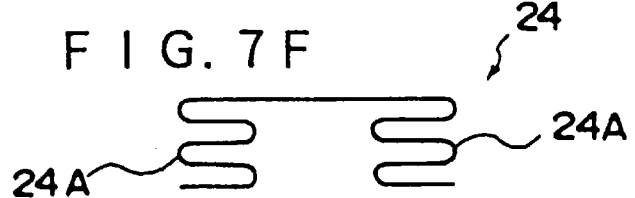
FIG. 7F is a diagram for explaining a method of folding the bag body shown in FIG. 1.

First, as shown in FIG. 7A, the bag body 24 is folded back in bellows along the folding lines P indicated by two-dotted chain lines (primary folding). Consequently, the bag body 24 assumes a contour as indicated by solid lines in FIG. 7B. Further, the bag body 24 is folded along the folding line Q indicated by the two-dot chain lines in FIG. 7B. At the same time, the bag body 24 is folded at the position of the folding lines R (secondary folding). As a result, the bag body 24 assumes a substantially corrugated contour as shown in FIGS. 7C and 7D. These diagrams show the initial state after secondary folding of the bag body 24, and from this state, the corrugated sides 24A of the bag body 24 are narrowed as shown in FIG. 7E. After that, as shown in FIG. 7F, the sides 24A are turned 90 degrees into the final folded state.

Comparison between FIGS. 4 and 5 shows that the sides 24A of the completely-folded bag body 24 are folded a smaller number of times in the shallow first holding space portion 108 (i.e., the upper space portion of the front bottom wall part 30A which is rectangular as viewed from the driver) of the air bag case 18 than in the deep second holding space portion 110 (i.e., the upper space of the rear bottom wall part 30B which is substantially triangular in shape as viewed from the driver) having the folding line R. The cylindrical inflator 26 is held between the sides 24A.

The space under the first holding space portion 108 of the air bag case 18 is used to accommodate the female connector 64 and the male connector 66 and also to hold a weight (not shown) for alleviating the vibrations of the steering wheel 12.

Now, the operation and effect of the present embodiment will be described.

According to this embodiment, the elongate cylindrical inflator 26 is used in place of the conventional flat, substantially cylindrical inflator. The inflator 26 is disposed vertically at the widthwise direction intermediate portion of the substantially box-shaped air bag case 18. In other words, the inflator 26 is arranged with the length thereof substantially perpendicular to the transverse direction of the vehicle when the steering wheel 12 is in neutral position. As a result, the comparatively large first and second holding space portions 108 and 110 are formed on the sides of the inflator 26 in the air bag case 18. This point provides the great difference of the embodiment from the conventional technique, and is the advantage of using the elongate cylindrical inflator 26 in the air bag apparatus 10 for the driver.

Further, according to this embodiment, taking into consideration the fact that the steering wheel 12 has three spokes, the bottom wall 30 of the air bag case 18 is stepped to differentiate the volume between the shallow first holding space portion 108 and the deep second holding space portion 110. This makes it possible to employ the folding method (especially, the secondary folding) described above for the bag body 24.

In addition, when the vehicle suddenly decelerates, the inflator 26 is activated to eject a gas from the gas ejection holes 72. This gas is rectified by the diffuser 28 and flows into and inflates the bag body 24. The top portion 50 of the air bag pad 20 thus is ruptured at the thin wall portion 54 and develops so that the bag body 24 expands toward the driver.

The general process of operation of this embodiment has been explained above. This operation shows that according to this embodiment, the first holding space portion 108 and the second holding space portion 110 having a sufficiently large spatial capacity can be secured on the sides of the inflator 26, thereby improving the folding freedom of the bag body 24. Consequently, according to the present embodiment, the bag body 24 can be made compact.

The present embodiment has taken advantage of this fact in designing the method of folding the bag body 24 (especially, the secondary folding) in such a way that the bag body 24 is folded different numbers of times depending on the sizes of the first holding space portion 108 and the second holding space portion 110. More specifically, the number of times the bag body 24 is folded is reduced in the shallow first holding space portion 108, and increased in the deep second folding space portion 110. The unevenness of the base cloth thus is eliminated between the first holding space portion 108 and the second holding space portion 110 to assure a uniform arrangement of the bag body 24 in both space portions. As a result, the feeling of physical disorder which otherwise might be caused when the driver touches the surface of the air bag pad 20 by hand is also eliminated. The feeling of operating the steering wheel 12 thus is improved for the driver. This feature is conspicuous especially in the case where a pressure-sensitive horn (center horn) is introduced for the steering wheel 124 as described later.

Further, according to this embodiment, the second holding space portion 110 in which the bag body 24 is folded an increased number of times is arranged in the rear part of the air bag case 18 far from the driver (in the lower portion of FIG. 2) on the three-spoke steering wheel. Therefore, the protrusion (the rear bottom wall portion 30B which is the portion one step lower of the bottom wall 30) of the air bag case 18 is not visible from the driver. The external appearance of the three-spoke steering wheel 12 having the air bag apparatus can thus be improved.

Also, according to this embodiment, the cylindrical portion 86B (corresponding to "a one end portion of the restriction means") of the strap 86 for restricting the inflation of the bag body 24 is fixed on the inflator 26, and the ends 86A (corresponding to "the other end portion of the restriction means") of the strap 86 are fixed on the first base cloth 82 as the driver's side base cloth. It is therefore not necessary to fix the other end portion of the strap 86 of the restriction means on the second base cloth 84, which is the base cloth which is far from the driver. The sewing work thus is facilitated.

Furthermore, according to this embodiment, since the substantially cylindrical diffuser 28 is arranged around the cylindrical inflator 26, the gas ejected from the inflator 26 can be allowed to flow into the bag body 24 while being diffused efficiently. In other words, according to this embodiment, the gas ejection holes 72 are formed only around the vicinity of a longitudinal direction one end portion of the inflator 26. In absence of the diffuser 28, the gas would flow only to one side. However, according to this embodiment, since the gas ejected from the gas ejection holes 72 is introduced into the bag body 24 from a plurality of equidistantly formed rectifying ports 78, a uniform gas flow path is secured. The bag body 24 can thus be inflated more rapidly.

In addition, in view of the fact that the top wall portion 28A of the diffuser 28 is formed flat and arranged substantially parallel to the surface of the air bag pad 20, i.e., in view of the fact that the top wall 28A of the diffuser 28 is free of unevennesses, the feeling of physical disorder which otherwise might be caused is eliminated when the driver's hand touches the pad surface. Consequently, the driver's operation feeling of the steering wheel is improved.

In place of the bag body 24 folded in the way shown in FIGS. 7A–7F, a bag body 120 may alternatively be used which is folded in the manner described below according to the present embodiment.

Figure 9:
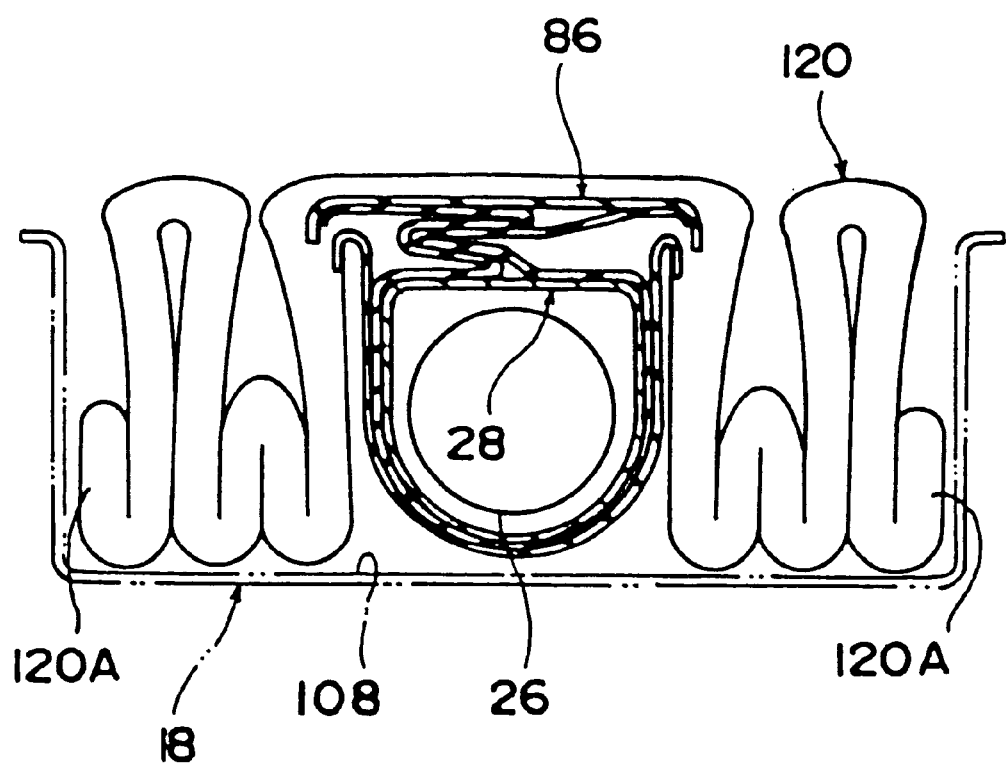
FIG. 9 is a cross sectional view of the main portion of an air bag apparatus comprising the bag body shown in FIG. 8, and corresponds to FIG. 4.

As shown in FIGS. 8 to 10, the bag body 120 is turned upside down in the initial stage of the secondary folding shown in FIG. 7C, (i.e. the fold protruded upward is turned to protrude downward, and vice versa, with the folding lines R arranged in positions opposite to those shown in FIG. 7C), after which the folding process is terminated in the stage shown in FIG. 7E. In this case, at the shallow first holding space portion 108, the bag 120 has the folding lines R and therefore the sides 120A of the bag body 120 involve a larger number of foldings (see FIG. 9), while the sides 120A are folded a lesser number of times in the deep second holding space portion 110 (FIG. 10).

This configuration has the same effect as that of the above-mentioned embodiment. Specifically, the unevenness is eliminated between the first holding space portion 108 and the second holding space portion 110 of the bag body 120 to secure a uniform arrangement of the bag body 120. In this way, the feeling of physical disorder is eliminated when the driver touches the steering wheel 12 by hand. In addition, in this case, the bag body 120 is folded more times in the first holding space portion 108 than in the second holding space portion 110. Therefore, this embodiment is excluded from the sixth aspect of the invention described in the SUMMARY OF THE INVENTION.

Figure 12:
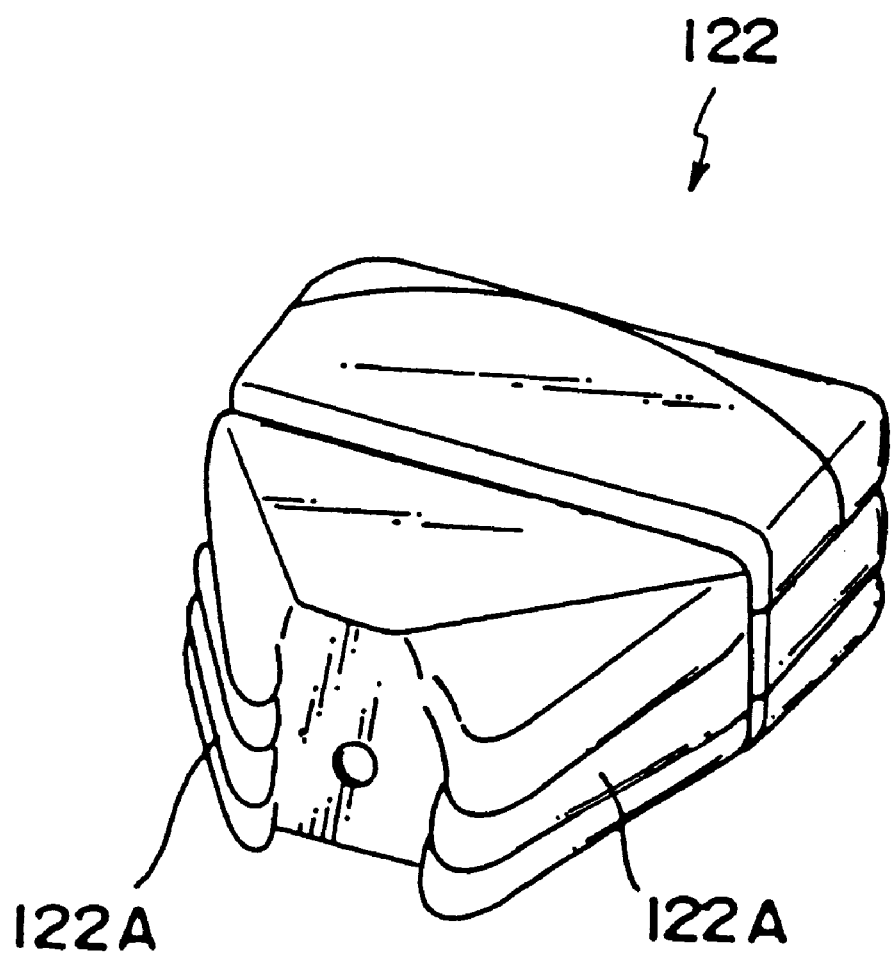
FIG. 12 is a perspective view of the bag body shown in FIG. 11 in the final state.

As shown in FIGS. 11 and 12, it is also possible to use a bag body 122 produced in such a way that the rear portions of the sides 122A of the bag body 122 folded in rectangular form in plan view are folded downward along the folding lines S indicated by two-dot chain lines. The folding method of this bag body 122 is basically the same as the conventional method. According to this embodiment, however, the inflator 26 has an elongate cylindrical shape, and therefore the bag body 122 is shorter along the widthwise direction thereof in general configuration. In addition, in this case, the sides 122A of the bag body 122 are folded the same number of times in the second holding space portion 110 as in the first holding space portion 108. Therefore, this embodiment is excluded from the fifth and sixth aspects of the present invention described in the SUMMARY OF THE INVENTION.

Also, according to this embodiment, the air bag apparatus 10 is mounted on the steering wheel 12 having the horn buttons 16 arranged on the spokes 12C, 12D. The invention is not limited to such a structure, but the air bag apparatus 10 may be mounted on the steering wheel 124 having a pressure-sensitive horn (i.e., a center horn) as shown in FIGS. 13 and 14.

As shown in FIG. 14, the pressure-sensitive switch 126 includes a pair of rectangular tabular switch elements 128 arranged at the central portion, wide resin sheets 130 extending away in opposite directions from the switch elements 128, and lead wires 132 arranged at the central portion of the resin sheets 130. The resin sheets 130 are for preventing the switch elements 128 from breaking off from the lead wires 132 when the air bag apparatus 10 inflates. The pressure-sensitive switch 126 is fixed on the air bag case 18 by means of welding points 130A of the resin sheets 130.

Figure 13:
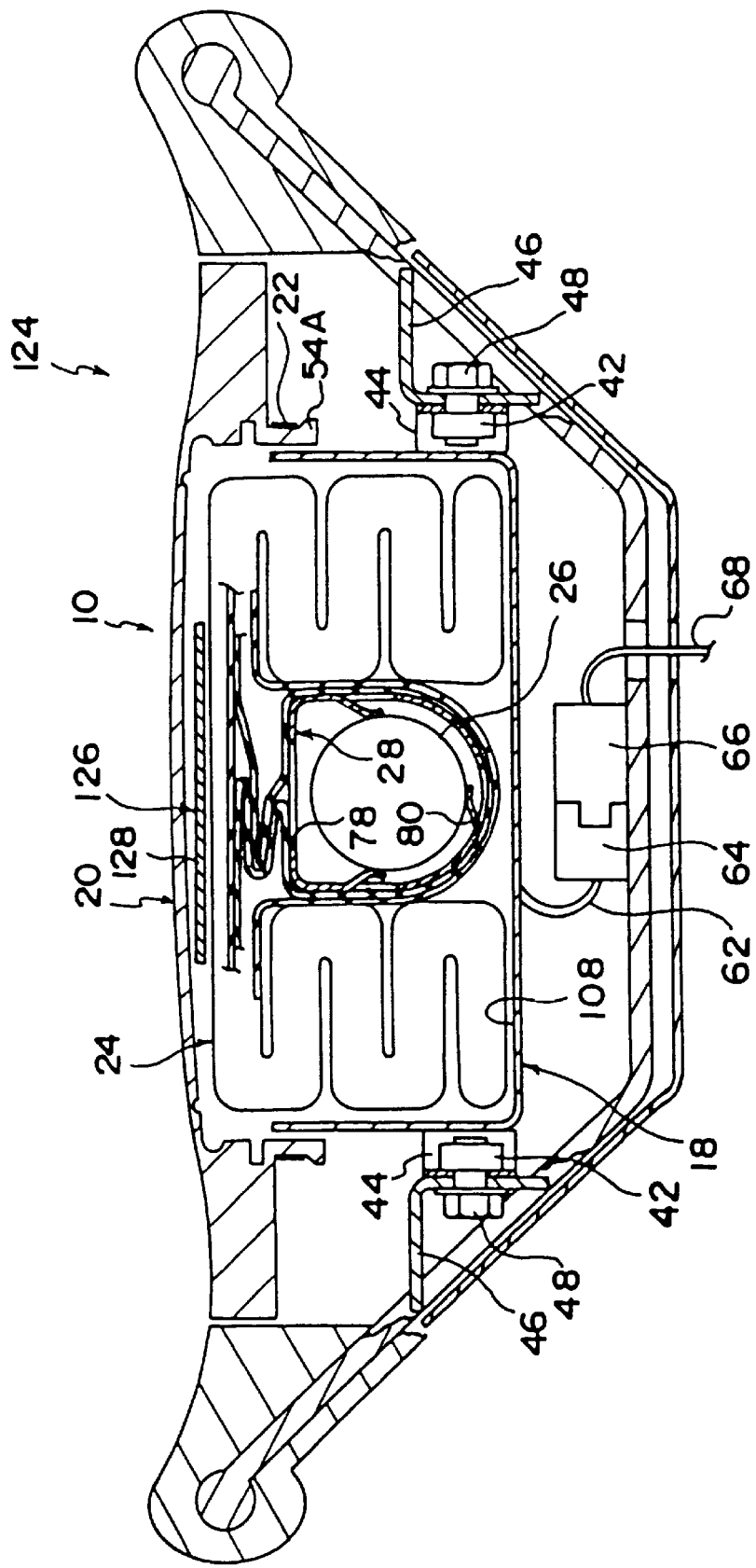
FIG. 13 is a cross sectional view of an embodiment using a pressure-sensing switch in place of the horn button arranged on the spoke, and corresponds to FIG. 4.
Figure 15:
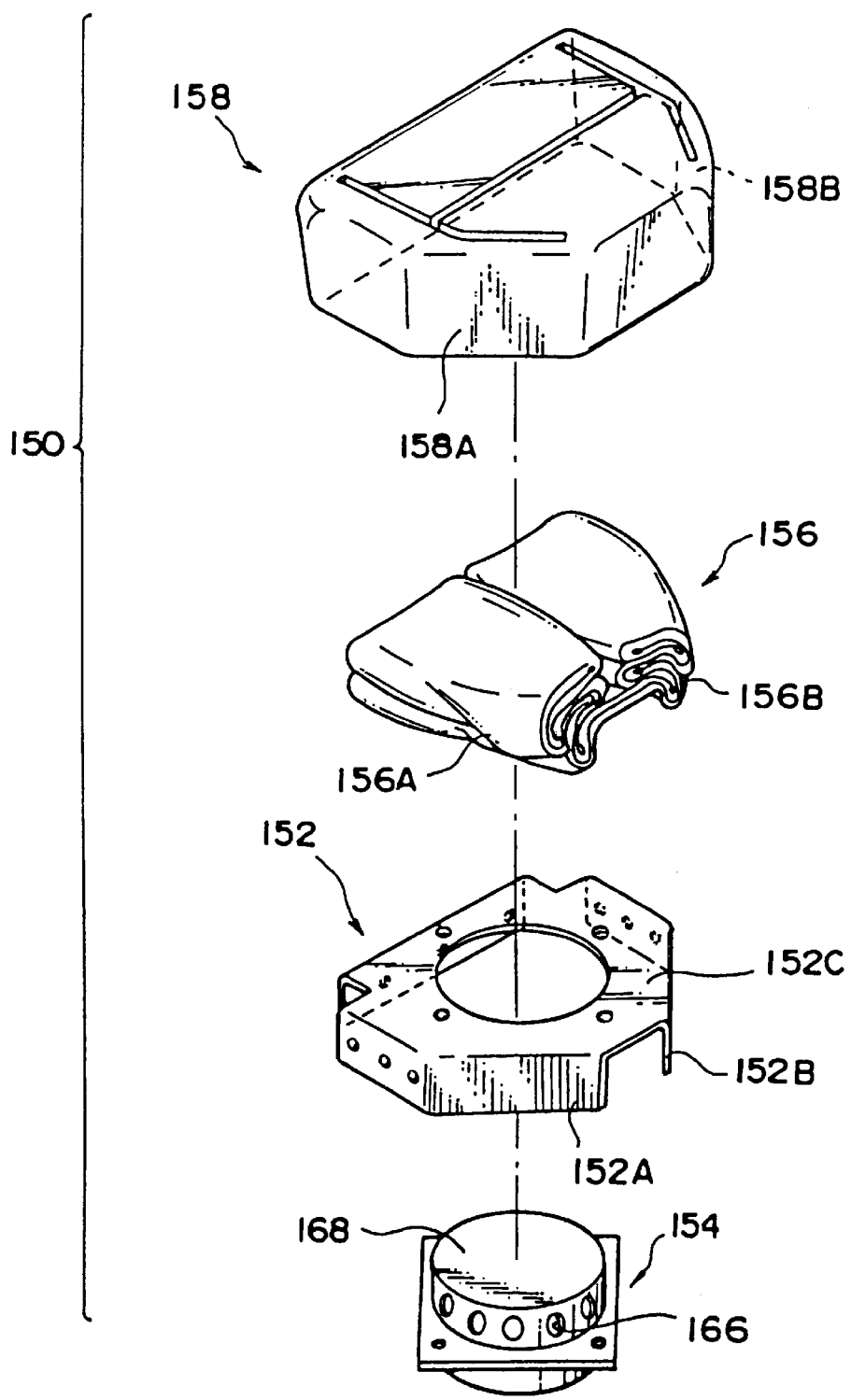
FIG. 15 is an exploded perspective view showing the structure of an air bag apparatus according to the prior art, and corresponds to FIG. 1.
Figure 16:
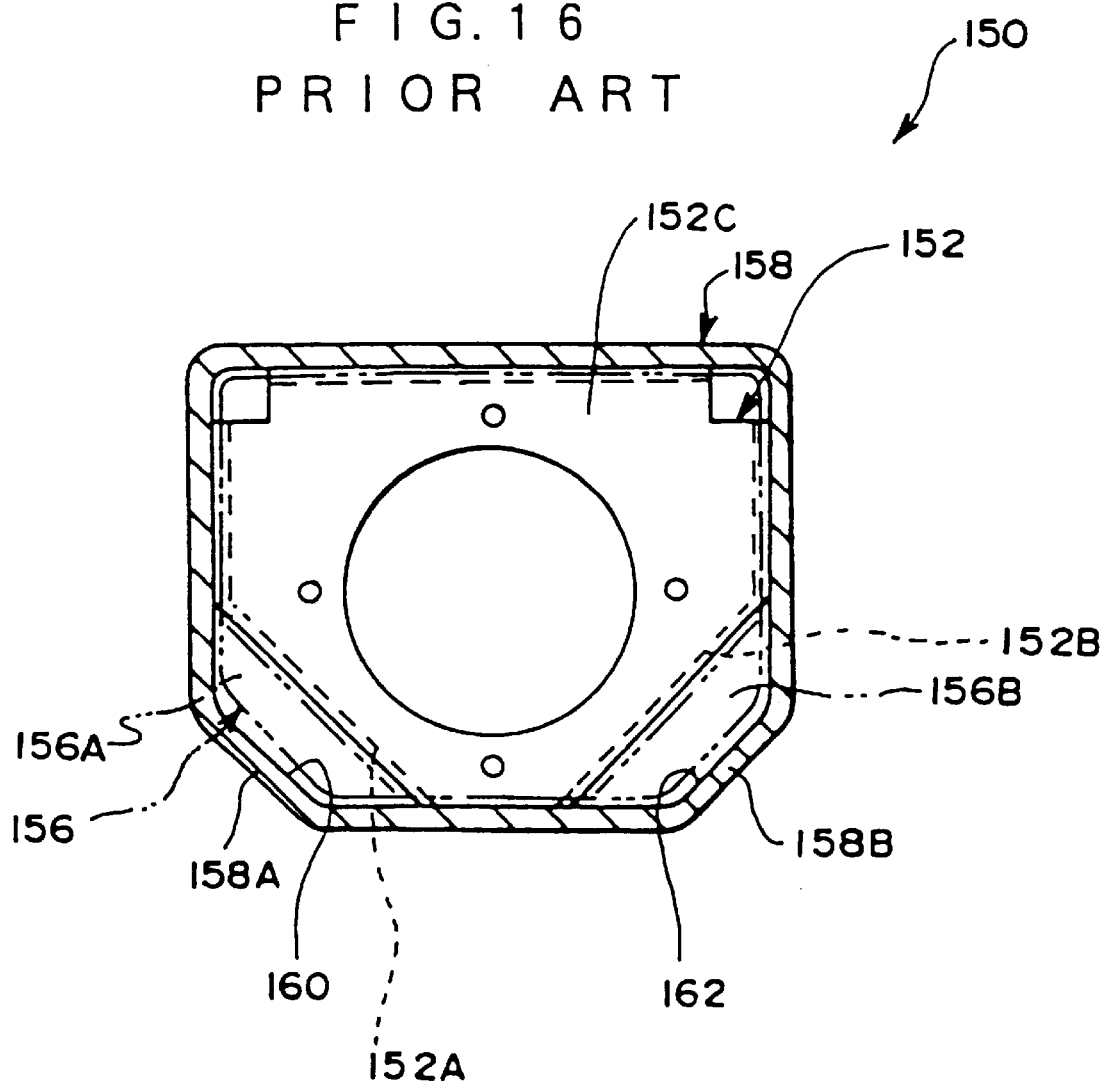
FIG. 16 is a horizontal sectional view showing the air bag apparatus of FIG. 15.
Figure 17:
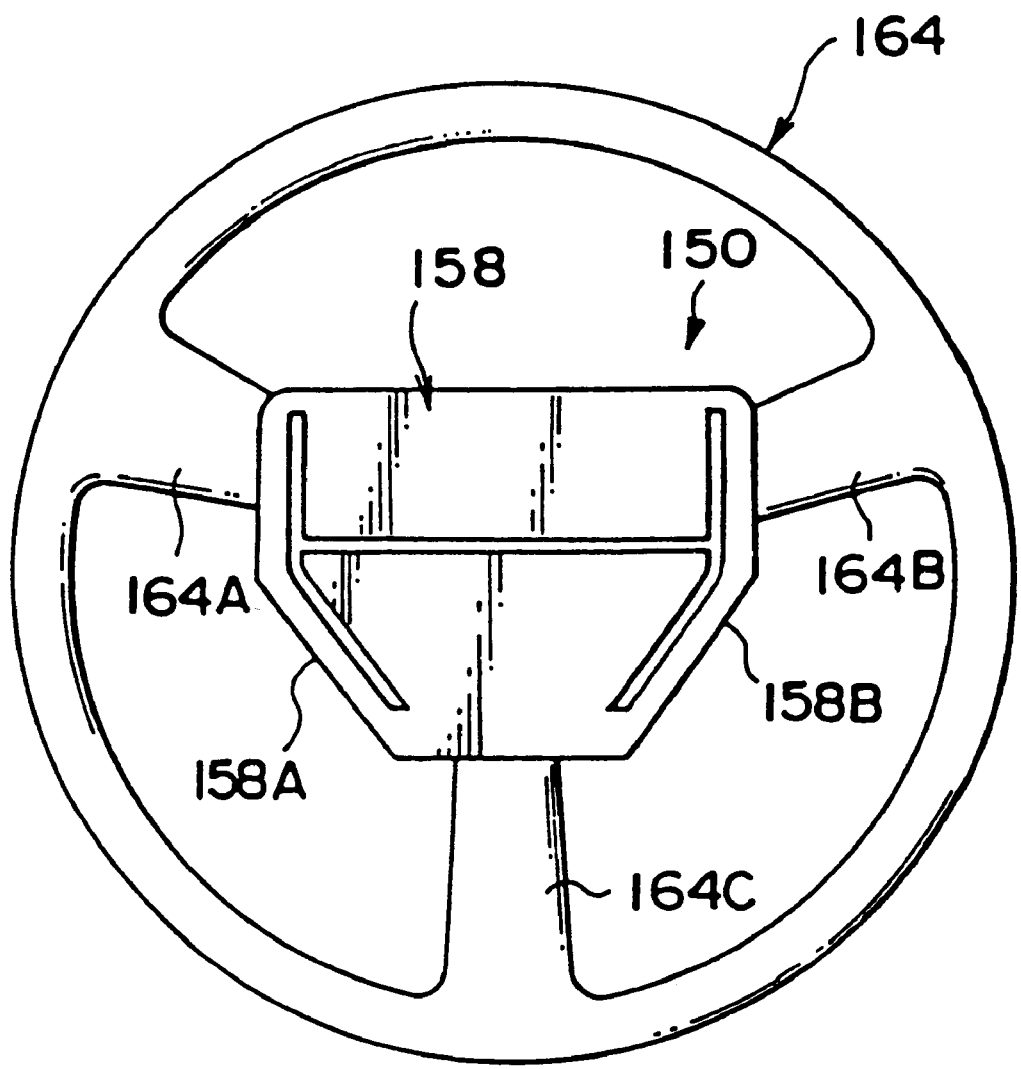
FIG. 17 is a front view showing a three-spoke steering wheel having the air bag apparatus of FIG. 15, and corresponds to FIG. 2.

As shown in FIG. 13, the switch elements 128 of the pressure-sensitive switch 126 as assembled in the apparatus are interposed between the air bag pad 20 and the bag body 24. Therefore, when the driver presses the air bag pad 20, the horn is activated as the switch elements 128 of the pressure-sensing switch 126 held between the air bag pad 20 and the bag body 24 are turned on under the pressure of the top wall 28A of the diffuser 28. In the process, the flat surface of the top wall 28A of the diffuser 28 leads to the advantage that the reaction force is positively exerted on the switch elements 128 when the air bag pad 20 is pressed. Also, since the greater portion of the bag body 24 is arranged on the sides of the inflator 26, the portion of the bag body 24 just above the top wall 28A of the diffuser 28 has a smaller thickness. Consequently, the distance by which the driver pushes down the pad in order to operate the horn is smaller than in conventional structures.

Further, this embodiment using the cylindrical inflator 26 may alternatively employ an elongate parallelopipedal inflator as long as it is elongate and substantially rectangular as viewed from the driver.

In addition, the present invention described above with reference to the three-spoke steering wheel 12 is also applicable with equal effect to what is called the four-spoke steering wheel.

What is claimed is:

1. An air bar apparatus comprising:

a base member supported on a steering wheel;

a bag body accommodated in said base member in a folded state;

an inflator mounted on said base member for ejecting a gas and inflating said folded bag body at the time of a vehicle collision, and said inflator is elongate and substantially rectangular in shape as viewed from a driver, and a longitudinal direction of said inflator is substantially perpendicular to a transverse direction of the vehicle when the steering wheel is in a neutral position, wherein said base member comprises a first folding space portion and a second folding space portion, said second folding space portion being deeper and narrower in the transverse direction of the vehicle than said first folding space portion; and a bottom portion of said second folding space portion located beneath a top portion of a connecting portion connecting a bottom portion of the steering wheel and a steering shaft in a longitudinal direction of the steering shaft.

2. The air bag apparatus according to claim 1, wherein said steering wheel is a three-spoke steering wheel.

3. The air bag apparatus according to claim 1, further comprising:

a restriction means for restricting inflation of said bag body, one end of said restriction means being fixed on said inflator and the other end of said restriction means being fixed on a driver side base cloth of said bag body; and a rectifying means provided around said inflator for rectifying the flow of the gas ejected from said inflator into said bag body, wherein when said rectifying means is mounted on said base member via said inflator, a surface of said rectifying means which opposes the driver and is flat, is disposed substantially parallel to a surface of a pad which covers said bag body.

4. The air bag apparatus according to claim 1, wherein said inflator is mounted in both said first folding space portion and said second folding space portion of said base member.

5. The air bag apparatus according to claim 1, wherein said bag body is folded at both vehicle transverse direction sides of said inflator in said base member.

6. The air bag apparatus according to claim 5, wherein said bag body is folded in a vertical transverse direction.

7. The air bag apparatus according to claim 6, wherein the number of times said bag body is folded in said second folding space portion is more than the number of times said bag body is folded in said first folding space portion.

8. The air bag apparatus according to claim 5, wherein said bag body is folded in a substantially vertical direction.

9. The air bag apparatus according to claim 8, wherein the number of times said bag body is folded in said second folding space portion is less than the number of times said bag body is folded in said first folding space portion.

10. The air bag apparatus according to claim 1, further comprising:

rectifying means provided around said inflator for rectifying the flow of the gas ejected from said inflator into said bag body, wherein when said rectifying means is mounted on said base member via said inflator, a surface of said rectifying means, which opposes the driver and is flat, is disposed substantially parallel to a surface of a pad which covers said bag body.

11. The air bag apparatus according to claim 10, wherein said rectifying means comprises a holding portion for holding said inflator therein.

12. The air bag apparatus according to claim 10, further comprising a centered horn switch.

13. The air bag apparatus according to claim 1, wherein said base member comprises a first groove portion and a second groove portion for fixing said inflator thereon, a width of said second groove portion in the transverse direction of the vehicle being formed wider than that of said first groove portion.

14. An air bar apparatus comprising:

a base member supported on a steering wheel;

a bag body accommodated in said base member in a folded state;

an inflator mounted on said base member for ejecting a gas and inflating said folded bag body at the time of a vehicle collision, and said inflator is elongate and substantially rectangular in shape as viewed from a driver, and a longitudinal direction of said inflator is substantially perpendicular to a transverse direction of the vehicle when the steering wheel is in a neutral position, wherein said base member comprises a first folding space portion and a second folding space portion, said second folding space portion being deeper and narrower in the transverse direction of the vehicle than said first folding space portion, wherein said bag body is accommodated at both vehicle transverse direction sides of said inflator in said base member;

a bottom portion of said second folding portion located beneath a top portion of a connecting portion connecting a bottom portion of the steering wheel and a steering shaft in a longitudinal direction of the steering shaft; and rectifying means provided around said inflator for rectifying the flow of the gas ejected from said inflator into said bag body, wherein when said rectifying means is mounted on said base member via said inflator, a surface of said rectifying means, which opposes the driver and is substantially flat, is disposed substantially parallel to a surface of a pad which covers said bag body.

15. The air bag apparatus according to claim 14, wherein said bag body is folded in a vertical transverse direction.

16. The air bag apparatus according to claim 15, wherein the number of times said bag body is folded in said second folding space portion is more than the number of times said bag body is folded in said first folding space portion.

17. The air bag apparatus according to claim 14, wherein said bag body is folded in a substantially vehicle vertical direction.

18. The air bag apparatus according to claim 17, wherein the number of times said bag body is folded in said second folding space portion is less than the number of times said bag body is folded in said first folding space portion.

19. The air bag apparatus according to claim 14, wherein said rectifying means comprises a holding portion for holding said inflator therein.

20. The air bag apparatus according to claim 14, further comprising a centered horn switch.

21. An air bar apparatus comprising:

a base member supported on a steering wheel;

a bag body accommodated in said base member in a folded state;

an inflator mounted on said base member for ejecting a gas and inflating said folded bag body at the time of a vehicle collision, and said inflator is elongate and substantially rectangular in shape as viewed from a driver, and a longitudinal direction of said inflator is substantially perpendicular to a transverse direction of the vehicle when the steering wheel is in a neutral position, wherein said base member comprises a first folding space portion and a second folding space portion, said second folding space portion being deeper and narrower in the transverse direction of the vehicle than said first folding space portion, wherein said bag body is accommodated at both vehicle transverse direction sides of said inflator in said base member; and a bottom portion of said second folding portion located beneath a top portion of a connecting portion connecting a bottom portion of the steering wheel and a steering shaft in a longitudinal direction of the steering shaft.

22. The air bag apparatus according to claim 21, further comprising a a rectifying means including a holding portion for holding said inflator therein.

23. The air bag apparatus according to claim 21, further comprising a centered horn switch.

* * * * *